United States Patent [19]

Suzuki et al.

[11] Patent Number: 4,907,254
[45] Date of Patent: Mar. 6, 1990

[54] POWER SOURCE CONTROL SYSTEM FOR DATA TERMINAL EQUIPMENT

[75] Inventors: Kenji Suzuki, Komae; Toshihiko Kato, Tokyo; Hisao Watanabe, Yokohama; Shuji Momomoto, Tokyo, all of Japan

[73] Assignee: Kokusai Denshin Denwa Kabushiki Kaisha, Tokyo, Japan

[21] Appl. No.: 259,509

[22] Filed: Oct. 14, 1988

Related U.S. Application Data

[63] Continuation of Ser. No. 62,215, Jun. 15, 1987, abandoned.

[30] Foreign Application Priority Data

Jun. 23, 1986 [JP] Japan ................. 61-144994

[51] Int. Cl.$^4$ ............................................. H04M 11/00
[52] U.S. Cl. ........................................ 379/93; 379/102
[58] Field of Search .................. 379/93, 95, 96, 97, 379/98, 102

[56] References Cited

U.S. PATENT DOCUMENTS

| | | | |
|---|---|---|---|
| 3,549,809 | 12/1970 | Stehr | 379/95 X |
| 3,745,251 | 7/1973 | Fretwell | 375/8 |
| 3,984,637 | 10/1976 | Caudill et al. | 379/95 X |
| 4,051,326 | 9/1977 | Badagnani | 379/96 |
| 4,356,545 | 10/1982 | West | 379/93 X |
| 4,430,728 | 2/1984 | Beitel et al. | 379/95 |
| 4,626,623 | 12/1986 | Lattaye | 379/95 |
| 4,647,721 | 3/1987 | Busam | 379/93 X |
| 4,656,318 | 4/1987 | Noyes | 379/98 X |
| 4,677,646 | 6/1987 | Dodds et al. | 379/93 X |
| 4,701,946 | 10/1987 | Oliva et al. | 379/93 X |
| 4,723,269 | 2/1988 | Summerlin | 379/102 |

Primary Examiner—Keith E. George
Attorney, Agent, or Firm—Emmanuel J. Lobato; Robert E. Burns

[57] ABSTRACT

A power source control system is disclosed for a data terminal which is connected to a communication line through a modem and a network control unit. A power source control unit is provided between the modem and the data terminal while interface between the modem and the data terminal is maintained so that when an incoming call to the data terminal is received and detected, a line establishing procedure is immediately executed with resepct to the calling party in place of the data terminal, and a main power source of the data terminal is turned ON, making the data terminal ready for a communication operation.

8 Claims, 8 Drawing Sheets

POWER SOURCE CONTROL SYSTEM FOR DATA TERMINAL EQUIPMENT

This is a continuation of application Ser. No. 062,215, filed 06/15/87, now abandoned.

BACKGROUND OF THE INVENTION

The present invention relates to a power source control system for data terminal equipment, which is connected to a communication line.

In recent years the processing performance of personal computers has made rapid progress and its communication facility has also markedly advanced. In consequence, the personal computers have materialized efficient data communications therebetween through a dedicated line or telephone network, and have come into wide use as an intelligent data terminal in a public data transmission service network, computer system, LAN, or similar other applications. In any case, there is a form of communication, which unilaterally transmits information to the data terminal or acquires information held in the data terminal. In this instance, there is a form of communication which permits the so-called automatic reception without the necessity of the attendance of an operator to a called data terminal. The automatic reception herein mentioned is the same as employed in conventional telex or facsimile communication system, whereby the power supply to the data terminal is turned ON upon receiving an incoming call and is turned OFF after completion of the communication message. This improves safety against accidents during the absence of an operator, for example, at night, and offers advantages of a more efficient utilization of equipment and less power consumption.

From such a point of view, an attempt has been made at the automatic reception also when the personal computer is employed as a data terminal. However, the automatic reception of prior art is intended to apply for an equipment which enables a communication immediately after the application of power to the equipment. In case of the personal computer, it is needed to load an operating system (OS) and communication software thereon after the application of power, and there must be a certain amount of time before the transmission of communication message. Consequently, the prior art could not be applied, as it is, to the personal computer.

That is, since functioning the personal computer as a data terminal involves the execution of a communication protocol, it is necessary that a program having such a function (a communication program) run on the personal computer. At the initial stage of a personal computer where the power source of the personal computer is OFF, the communication program exists on a magnetic disc or like nonvolatile memory, along with an operating system (OS). When the power source is turned ON, the operating system is loaded on a main memory through the operation of an initial program loader (IPL) and then, by the operation of the operating system, the communication program is loaded and executed. The program loading time until the running of the program varies with the property of the program but usually ranges from dozens of seconds to one minute.

Because of the above-noted characteristic of the personal computer, a nonanswering time would be made to the calling party for dozens of seconds to one minute in the prior art which turns ON the power to the personal computer immediately after the detection of the incoming call. In a case where the called party is always specified as in the case of communication using a dedicated line, such a phenomenon could be avoided by preparing the communication program of the calling party in anticipation of this nonanswering time. In a public telephone network or public data network, however, the time interval between the arrival of an incoming call and its answering operation is generally limited and if no answer is given within the limited period of time, the line is disconnected by assuming that the called data terminal is not in operation. Accordingly, in the prior art there is a possibility that no communication line is established although the called data terminal makes preparations for the incoming call.

Incidentally, according to the "Rules concerning technical standards relating to a contract for the use of a public communication line (telephone)" of NTT (NIPPON TELEGRAPH AND TELEPHONE CORPORATION), it is prescribed that the automatic originating function is to open a DC circuit within 60 seconds after sending a select signal when the called party does not answer.

As described above, when the personal computer is used as a data terminal, the prior art which turns ON the power to the personal computer simply upon the detection of an incoming call (a ringing) does not satisfy the above-noted rules, resulting in the problem that no communication line is established.

SUMMARY OF THE INVENTION

An object of the present invention is to provide a power source control system for data terminal equipment which ensures accurate establishment of a communication line when the data terminal is called. The power source control system of the present invention features the provision of means which, upon detecting an incoming call to the data terminal, performs a line establishing procedure in response to the incoming call and turns ON the power to the data terminal, making it ready for mutually transfering communication messages.

As an interface of the personal computer to a communication line, there has been widely employed an interface RS-232C standardized by EIA (Electronics Industries Association of the United States). This interface was originally determined as a standard for interconnecting a modem to a data terminal in the case of connecting the data terminal to a communication line via the modem, but in recent years it has been widely used as in interface not only for the connection of the data terminal to the modem but also for the transmission and reception of information.

Therefore, the present invention takes into account the above-mentioned interface of the data terminal to a communication line, and when the data terminal receives an incoming call, a power source control unit controls the power source of the data terminal and, at the same time, it executes a signal procedure for establishing the communication line in place of the data terminal, until the data terminal becomes ready for mutually transfering communication messages, thereby ensuring an accurate establishment of the communication line.

BRIEF DESCRIPTION OF THE DRAWINGS

The present invention will be described in details below with reference to the accompanying drawings, in which.

DETAILED DESCRIPTION

Figure 1:
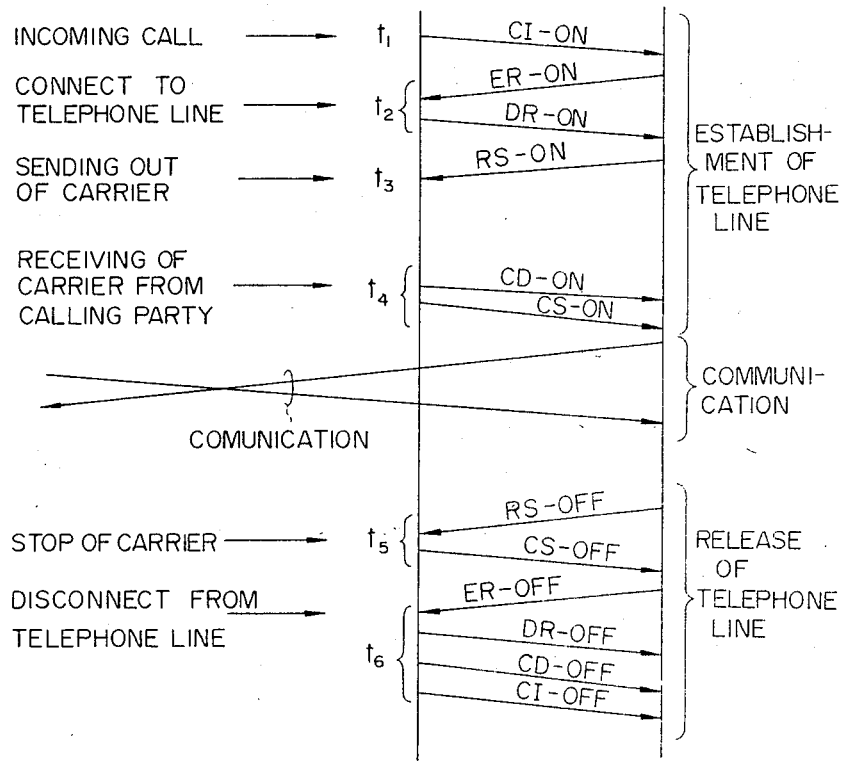
FIG. 1 is a flowchart showing a signal procedure between a data terminal and a communication line.

Referring first to FIG. 1, a description will be given of an example of the signal procedure in case of connecting a conventional data terminal to a telephone line via a network control unit (NCU) and a modem through use of the interface RS-232C. The principle of the present invention will be described based on the conventional signal procedure. Incidentally, names of signals used will be abbreviated in the following description, and the abbreviated names and the directions of transmission of the signals are such as given in the following Table 1.

TABLE 1

| Names of Signals | Abbreviated Names | Directions of Transmission of Signals |
| --- | --- | --- |
| Request to send | RS | Data terminal → Modem |
| Clear to send | CS | Modem → Data terminal |
| Data set ready | DR | Modem → Data terminal |
| Data terminal ready | ER | Data terminal → Modem |
| Data channel reception carrier detect | CD | Modem → Data terminal |
| Calling/indicator | CI | Modem → Data terminal |
| Control signal for automatic power source control unit | PO | Data terminal → Modem |

In FIG. 1 reference numeral 1 indicates a telephone line, 2 a network control unit (NCU), 3 a modem, and 4 a data terminal. The NCU 2 performs an operation procedure for an exchange of a telephone network, i.e. the closing and opening of a DC circuit, the delivery of dial pulses, etc. The signal procedure shown in FIG. 1 is based on full duplex communication.

Upon receiving a ringing from the telephone line 1, the NCU 2 indicates the incoming call to the modem 3, which turns ON the signal CI for the data terminal 4. The data terminal 4 which has detected the turning-ON of the signal CI turns ON the signal ER if it can respond to the incoming call. The information on the signal ER is also passed to the NCU 2, which in turn sends an answer signal to the telephone network. At this point of time, the telephone line 1 is established between the called data terminal and the calling party, and the modem 3 is connected to the telephone line 1 and turns ON the signal DR for the data terminal 4. The data terminal responds to the signal DR to turn ON the signal RS. The modem 3 starts to generate a carrier by the signal RS. After this, when a carrier from the calling party is detected, the modem turns ON the signals CD and CS, thereby informing the data terminal 4 that the mutual transfering of communication messages has been enabled. Upon detecting the turning ON of the signals CD and CS, the data terminal 4 initiates a data transfer or similar communication on the assumption that the preparation for communication has been completed.

Upon completion of the communication, the data terminal 4 turns OFF the signal RS, in response to which the modem 3 turns OFF the carrier and turns OFF the signal CS for the data terminal 4. Next, when the data terminal 4 turns OFF the signal ER on the assumption that the communication line is no longer necessary, the modem 3 sends to the NCU 2 information for disconnecting the telephone line 1 and turns OFF the signals DR, CD and CI, thus returning to its initial state.

The signal procedure described above is an example for employing the RS-232C interface. In this example, the signal CI has been described to be held ON during communication, but according to the setting conditions of the modem 3, it is possible to turn OFF automatically after a certain period of time from the detection of the incoming call. This will be described later in connection with an embodiment of the present invention.

The afore-mentioned problem which occurs in a case where an incoming call is received when the power source of the data terminal 4 is OFF lies in that the signals ER and RS from the data terminal 4 are not turned ON in response to the turning ON of the signal CI from the modem 3, as will be evident from FIG. 1. Unless the signal ER is turned ON the telephone line 1 is not established and unless the signal RS is turned ON no carrier is sent out from the modem 3; this will incur the possibility of the calling party misconceiving that the called party is not the data terminal.

In short, in the case of full duplex communication employing the RS-232C interface, the telephone line 1 will not be disconnected by the calling party so long as the telephone line 1 is established (an answer to the telephone network) and the modem 3 sends out the carrier.

The basic concept of the present invention resides in the provision of a power source control unit between the modem 3 and the data terminal 4, which controls the power source of the data terminal and immediately executes the procedures $t_1$ to $t_3$ in FIG. 1 upon receiving an incoming call.

A description will be given, with reference to FIG. 2, of the operation procedure according to the present invention.

Figure 2:
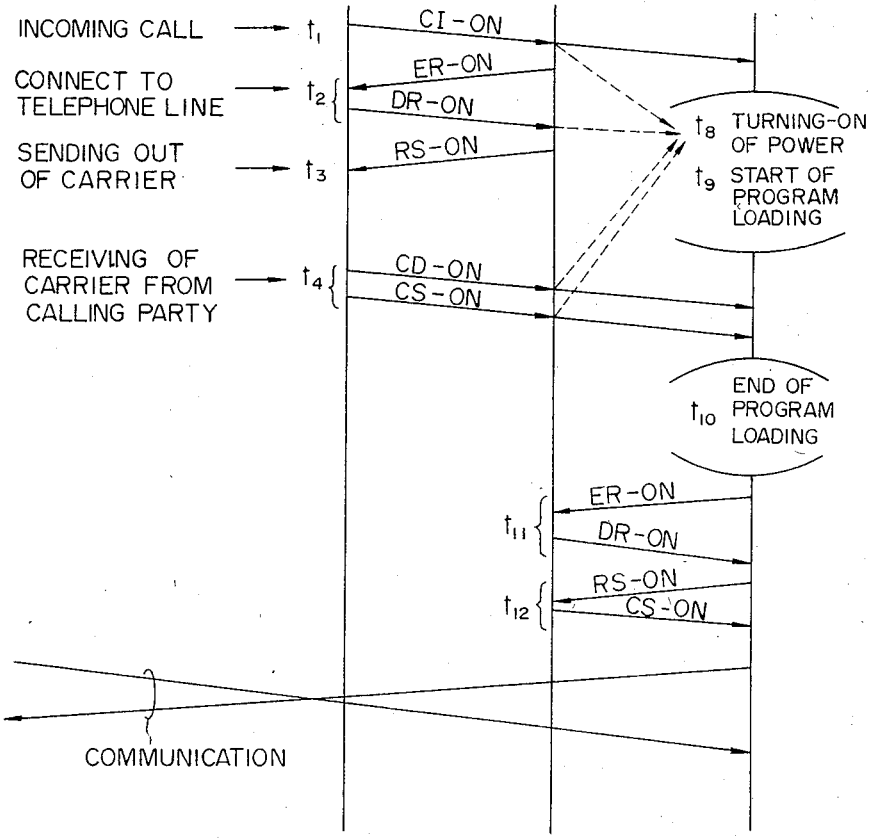
FIGS. 2 and 3 are flowcharts explanatory of the principle of the present invention.

As will be evident from comparison of FIGS. 1 and 2, a power source control unit 5 of the present invention sends the signal ER to the modem 3 in response to the signal CI from the latter before receiving any signal from the data terminal 4 as shown in FIG. 2. Furthermore, after the data terminal 4 is initialized by the application of the power, the control unit sends the signal DR to the data terminal 4 in response to the signal ER from the latter. At the timing $t_{11}$ and $t_{12}$ of the signals ER and RS, the modem 3 and the data terminal 4 are directly coupled logically with each other. It is possible that the signal CS is held in the power source control unit 5 at the time $t_4$ and is sent out therefrom to the data terminal 4 at the time $t_{12}$. The signal CD may also be held in the power source control unit 5 and sent to the data terminal 4 after the time $t_{12}$. That is, sequence control is effected for turning ON the signals CI, ER, DR, RS and CS, but no sequence control is effected for turning ON the signal CD and it is used as a status indication.

Now, a discussion will be made on the timing $t_8$ for turning ON the power to the data terminal 4.

The power source may be turned ON at the timing of turning ON any one of the signals CI, DR, CS and CD which are indicated from the modem 3. By turning ON the power source of the data terminal 4 at the timing of turning ON the signal CI, the data terminal 4 can rapidly be made ready for communication. However, in case where an incoming call is a wrong call from a non-data terminal, the application of the power to the data terminal 4 is of no use. Next, when the timing of turning ON the signal CD is used, the power source of the data terminal 4 is turned ON after receiving the carrier from the calling party; this means that the type of the calling terminal is identified. However, this takes more time until the ready for communication than in the case of turning ON the power source of the data terminal 4 at the timing of turning ON the signal CI.

Incidentally, the use of the timing of turning ON the signal DR makes little difference from the use of the timing of turning ON the signal CI, and the use of the timing of turning ON the signal CS does not make much difference from the use of the timing of turning ON the signal CD. For the identification of a wrong telephone call from a non-data terminal, it is necessary only to detect that the signal CD is not turned ON within a predetermined period of time after the modem 3 has sent out the carrier in response to the turning ON of the signal CI or RS.

Next, a description will be given, with reference to FIG. 3, of a procedure for turning OFF the power supply to the data terminal 4 after completion of desired communication.

Upon completion of communication, the data terminal 4 turns OFF the signal RS and then the signal ER. The simplest way of turning OFF the power source of the data terminal 4 is to utilize the turning OFF of the signal ER. However, the data terminal 4 may sometimes execute another job on the basis of information obtained from the calling party, in which case the signal ER is turned OFF after completion of the job. In such an instance, the telephone line 1 is held until the signal ER is turned OFF, and this seems to be uneconomical. To avoid this, the signal ER is turned OFF at the point of time when the telephone line 1 becomes unnecessary, and the power source of the data terminal 4 is turned OFF after a predetermined period of time T (at $t_{17}$ from the turning OFF of the signal ER, by which the execution of the job as a postprocess is ensured. It is also possible to introduce an alternative method. The communication programs of the data terminal 4 decide the point of time when the job is finished, and then request the power control unit 5 to turn OFF the power source by a signal PO, which is indicated through an idle signal line of the RS-232C interface. This makes the operation more complete.

EMBODIMENT

An embodiment of the present invention will hereinafter be described in detail.

Figure 3:
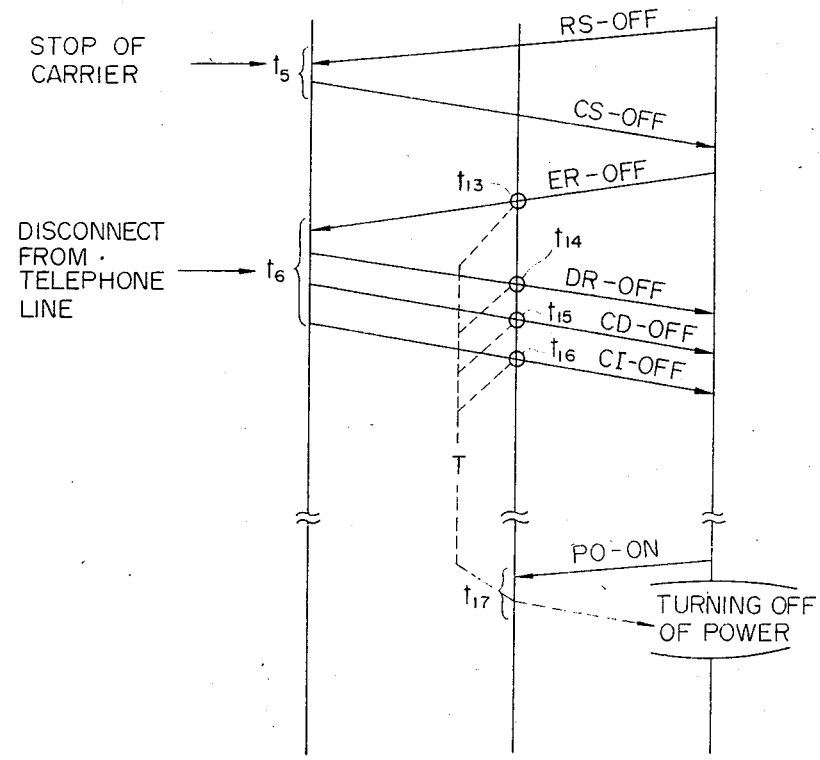
Figure 4:
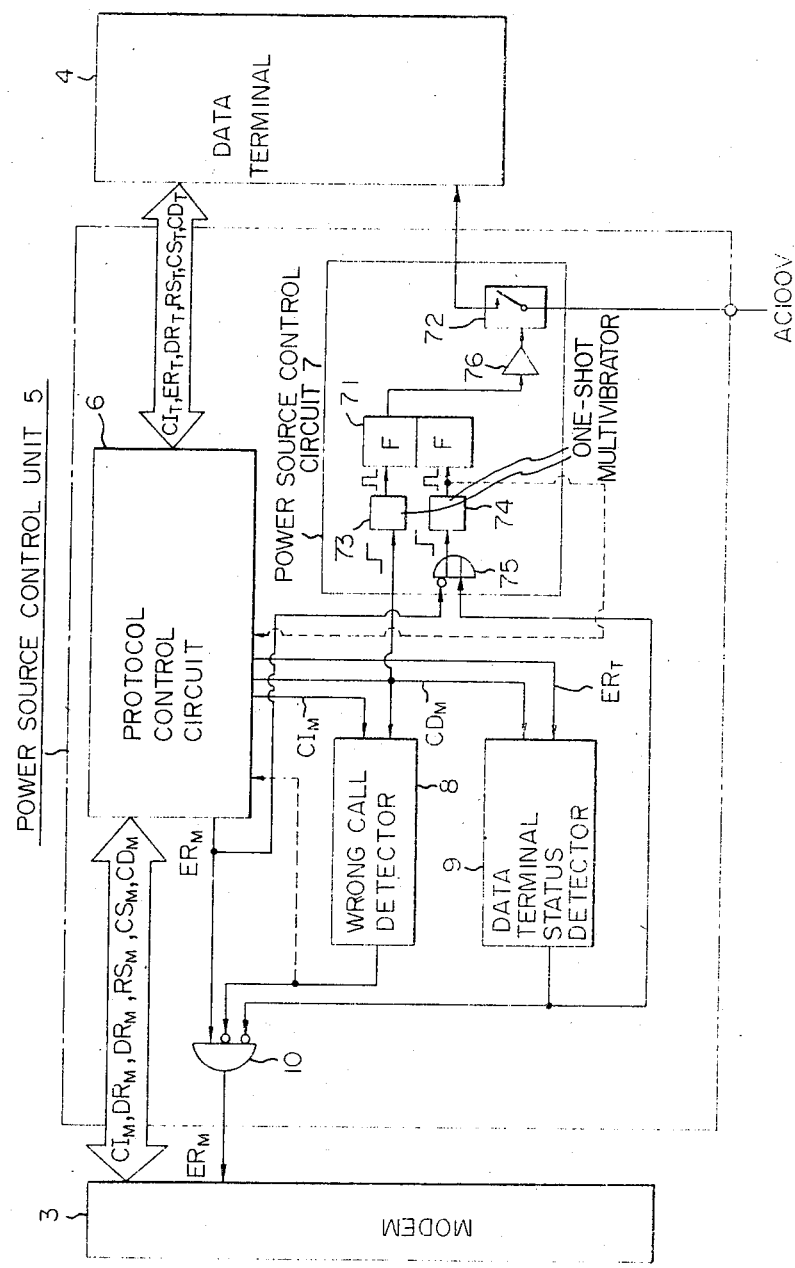
FIG. 4 is a block diagram illustrating an embodiment of the present invention.

FIG. 4 illustrates an embodiment of the present invention. This embodiment is composed principally of a protocol control circuit 6 which executes the signal procedures shown in FIGS. 2 and 3 and a power source control circuit 7 which controls the power source of the data terminal 4, and additionally includes a wrong call detector 8 and a data terminal status detector 9. The wrong call detector 8 decides that the incoming call is a wrong call when a measured time from the turning ON of the signal CI to the turning ON of the signal CD is longer than a predetermined time. The data terminal status detector 9 detects a case where although the power source of the data terminal 4 has been turned ON, for example, the loading of a program fails and the signal ER does not turn ON. RS-232C interface is generally used for a 25-pin connecter, but in FIG. 4 only required signal lines for the present invention are shown.

The embodiment of FIG. 4 shows a case where the power source of the data terminal 4 is turned ON at the timing for turning ON the signal CD and turned OFF at the timing for turning OFF the signal ER.

Figure 5A:
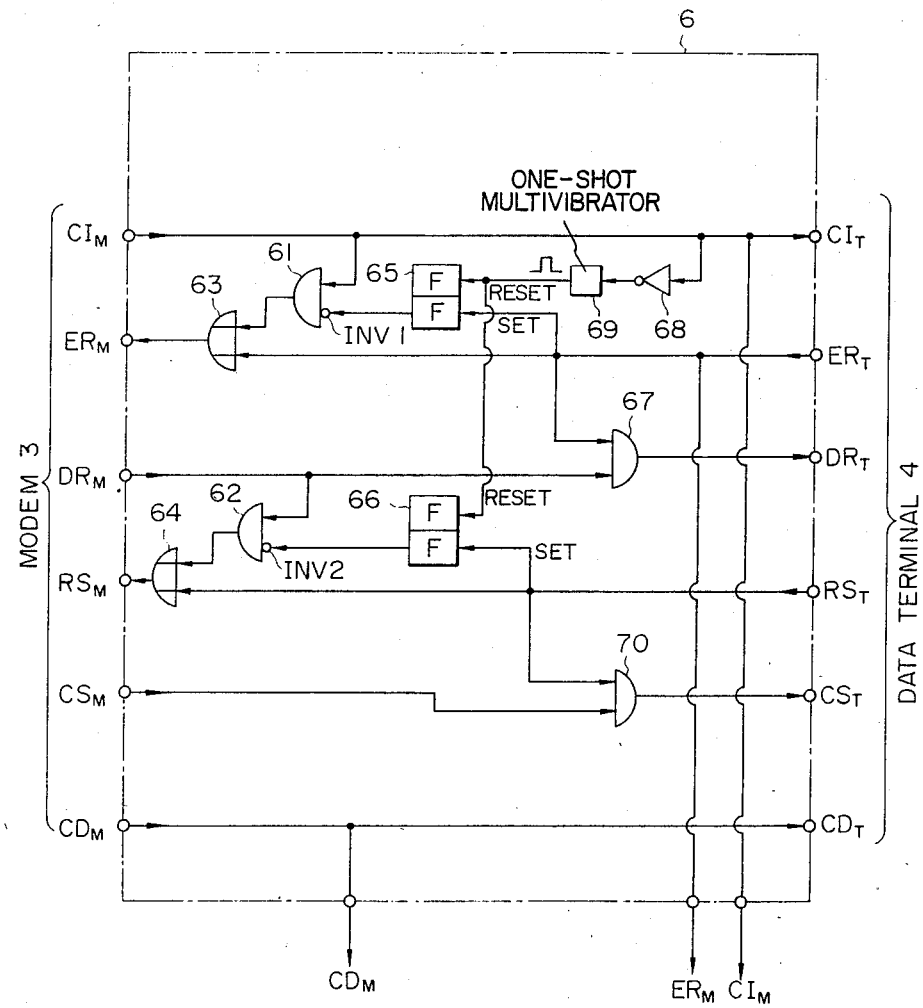
FIGS. 5A and 5B are block diagrams showing specific operative examples of a protocol control circuit for use in the embodiment depicted in FIG. 4.
Figure 5B:
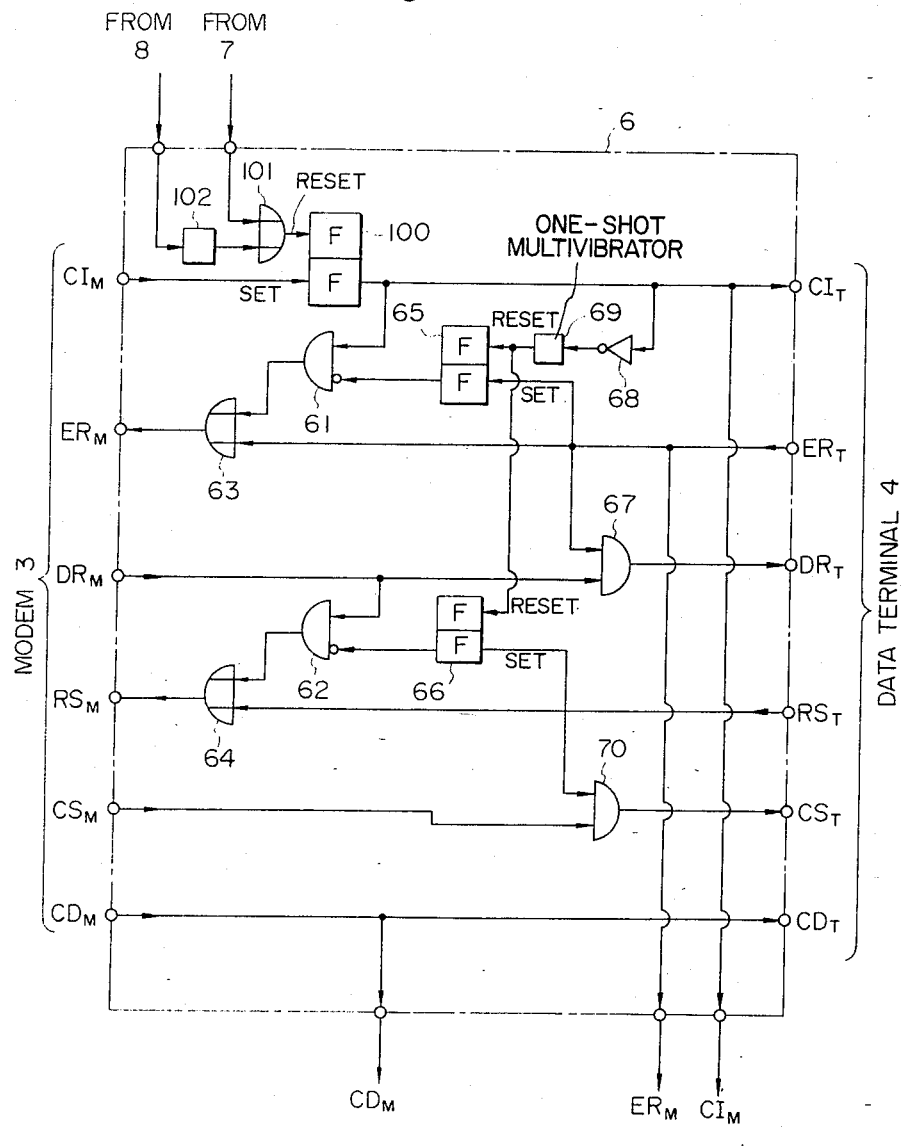

The protocol control circuit 6 will be described first. The arrangement shown in FIG. 5A is employed in a case where the signal CI remains ON during communication, and the arrangement depicted in FIG. 5B is used in a case where the signal CI have been once turned ON and then is turned OFF a predetermined period of time. In FIG. 5A, reference numerals 61, 62, 67 and 70 indicate AND gates, 63 and 64 OR gates, 65 and 66 flip-flops, 68 an inverter, and 69 a one-shot multivibrator. Small circles attached to the AND gates 61 and 62 indicate inverters.

The AND gates 61 and 62 are both open depending on the functions of inverters INV1 and INV2 unless the data terminal 4 starts and the flip-flops 65 and 66 are set. At first, a signal $CI_M$ from the modem 3 passes through the AND gate 61 and the OR gate 63 and is looped back, as a signal $ER_M$, to the modem 3. Next, a signal $DR_M$ from the modem 3 passes through the AND gate 62 and the OR gate 64 and is looped back, as a signal $RS_M$, to the modem 3. Furthermore among the signals $CS_M$ and $CD_M$ which are sent from the modem 3, the signals $CS_M$ is held by the AND gate 70 and the signal $CD_M$ is transmitted to the data terminal 4. These operations correspond to the sequences from the timing $t_1$ to $t_4$ in FIG. 2. When the power source of the data terminal 4 is turned ON in response to the turning ON of the signal $CD_M$ so that the data terminal 4 becomes ready for communication, a signal $ER_T$ is at first turned ON, by which the AND gate 67 is enabled, applying a signal $DR_T$ to the data terminal 4. At the same time, since the flip-flop 65 is set to disable the AND gate 61, the signal $CI_M$ is released from the loop-back, and the signals $ER_T$ and the $ER_M$ are directly coupled logically with each other.

Next, when a signal $RS_T$ is turned ON, the flip-flop 66 is set to disable the AND gate 62, releasing the signal $DR_M$ from the loop-back. After this, the signals $RS_T$ and $RS_M$ are directly coupled logically with each other. At this time, the AND gate 70 is enabled, from which the signal $CS_M$ is also sent to the data terminal 4.

Next, a description will be given of the operation of turning OFF the power source, as shown in FIG. 3. When the signal $RS_T$ is turned OFF, the signal $RS_M$ is also turned OFF. Next, when the signal $ER_T$ is turned OFF, the signal $ER_M$ is also turned OFF, and at the same time the AND gate 67 is disabled, resulting in turning OFF the segnal $DR_T$. In this instance, the outputs from the flip-flops 65 and 66 remain the state "1"

regardless of the signals $ER_T$ and $RS_T$ being in the OFF state. Accordingly, the modem 3 is assured of its normal operation without looping the signals $CI_M$ to $DR_M$ and the signals $ER_M$ to $RS_M$, respectively.

When the signals $ER_M$ is turned OFF, the modem 3 turns OFF the signal $CI_M$. The inverter 68 and the one-shot multivibrator 69 detect the fall of the signal $CI_M$ and reset the flip-flops 65 and 66. Thus, the circuit returns to its initial state.

The circuit depicted in FIG. 5B differs from the circuit of FIG. 5A only in the provision of a flip-flop 100 for retaining the signal $CI_M$ in the ON state during communication. This flip-flop 100 is reset at the timing of the start of the wrong call detector 8 and at the timing of the end of communication for resetting a flip-flop 71 of the power source control circuit 7. In FIG. 5B, reference numeral 101 indicates an OR gate and 102 a one-shot multivibrator.

Figure 6:
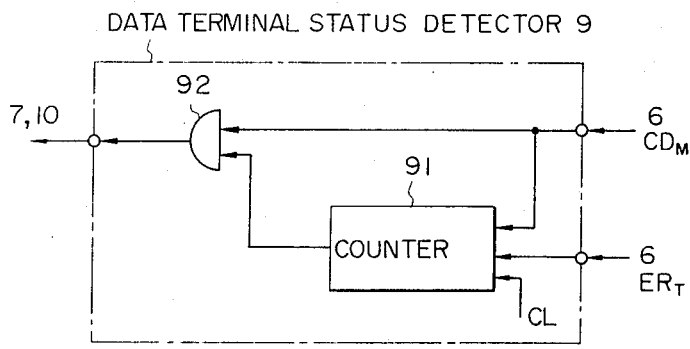
FIG. 6 is a block diagram illustrating a specific operative example of a data terminal status detector for used in the embodiment shown in FIG. 4.

Turning back to FIG. 4, the wrong call detector 8 yields a state "1" when the signal $CD_M$ is not detected within a fixed period of time after the detection of the signal $CI_M$, and the data terminal status detector 9 generates a state "1" when the data terminal 4 does not turn ON the signal $ER_T$ within a fixed period of time although the power supply has been connected to the data terminal in response to the turning ON of the signal $CD_M$. These two circuits control a flip-flop 10. When either one of them produces a state "1", the signal $ER_M$ is turned OFF, requesting the modem 3 to disconnect the telephone line 1. Since these two circuits 8 and 9 are substantially identical in construction. An embodiment of the data terminal status detector 9 is shown in FIG. 6. In FIG. 6, a counter 91 starts the counting of clock pulses CL in response to the turning ON of the signal CD and resets its counted value upon turning ON of the signal $ER_T$. When the counted value of the counter 91 exceeds a predetermined full-scale value, the counter enables an AND gate 92 by the most significant digit output, generating a state "1".

While the flip-flop 71 is set, the power source control circuit 7 in FIG. 4 actuates a relay 72 via a driving amplifier 76, supplying the power to the data terminal 4. The flip-flop 71 is set at the timing of the rise of the signal $CD_M$ which is detected by a one-shot multivibrator 73, and it is reset at the timing of the fall of the signal $ER_M$, which is detected by an OR gate 75 and a one-shot multivibrator 74, and at the timing of the rise of the output from the data terminal status detector 9.

Figure 7:
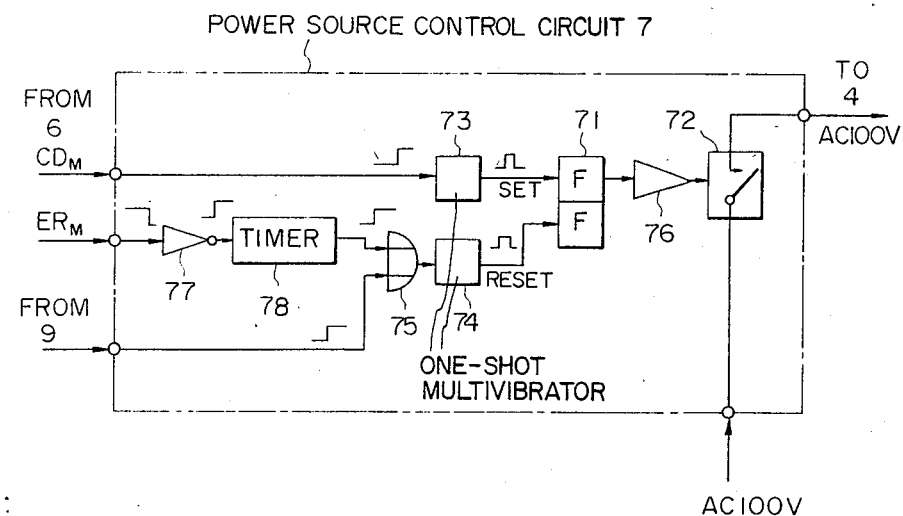
FIG. 7 is a block diagram illustrating another specific operative example of a power source control circuit used in the embodiment dipicted in FIG. 4.

FIG. 7 illustrates an example of the power source control circuit 7 which supplies the power to the data terminal 4 so as to enable it to execute a job even after the turning OFF of the signal $ER_M$. This example is idential in construction with the power source control circuit 7 in FIG. 4 except that a timer 78 is provided for delaying the timing for resetting the flip-flop 71 by a predetermined period of time.

Next, a description will be given, with reference to FIG. 8, of another embodiment which turns ON the power source of the data terminal 4 by turning ON the signal $CI_M$. This embodiment differs from the embodiment of FIG. 4 in the following points: (1) The power source control circuit 5 also normally holds its own power source in the OFF state and turns it ON when receiving the signal $CI_M$ from the modem 3; (2) since the power source of the data terminal 4 is turned ON with the signal $CI_M$, the power source cannot immediately be turned OFF at the time of detecting a wrong telephone call due to the fact that the data terminal 4 is already in the process of loading a program; and (3) the data terminal 4 delivers the power OFF command PO under control of a program.

Figure 8:
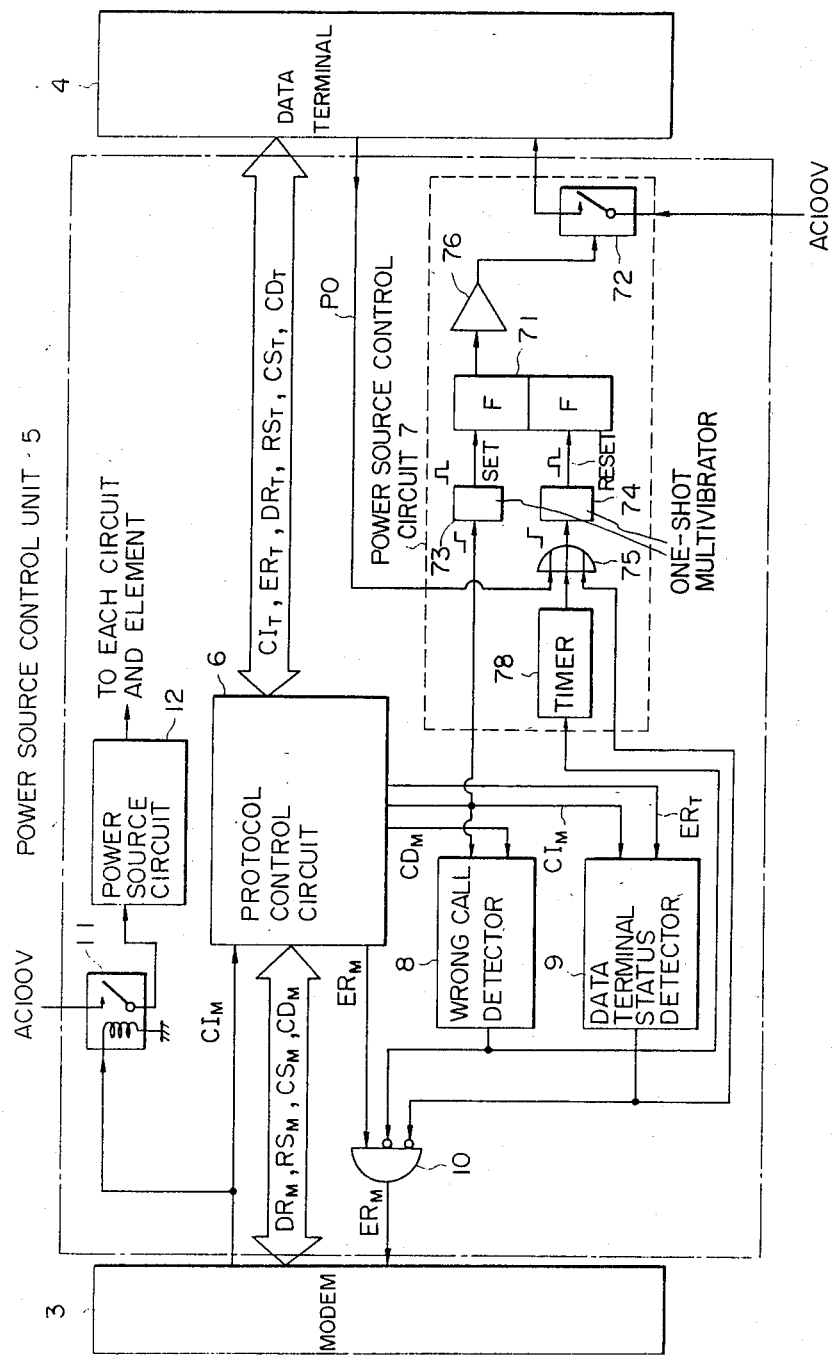
FIG. 8 is a block diagram illustrating another embodiment of the present invention.

In FIG. 8, for the operation (1), the signal $CI_M$ from the modem 3 is applied to a relay 11 to make it, by which a power source circuit 12 is activated, causing the power source control unit 5 to rise. For the operations (2) and (3), the flip-flop 71 in the power source control circuit 7 is set by the rise of the signal $CI_M$ and reset by the signal PO or the outputs from the detectors 8 and 9, and also especially for the output from the wrong call detector 8, timer 78 is introduced to provide a predetermined period of delay, taking into account the above-mentioned loading operation of the data terminal. In this embodiment the signal $CI_M$ must be held ON during a communication operation. Furthermore, since the power source of the power source control unit 5 is also turned OFF by the turning OFF of the signal $CI_M$, the resetting of the flip-flops 65 and 66 in the protocol control circuit 6 need not be taken into consideration.

The above has described in detail embodiments of the present invention. Incidentally, there are many combinations of the timing for turning ON and OFF the power supply to the data terminal 4, as referred to previously in connection with the constitution and operation of the present invention. Since they are obvious on the analogy of the arrangements shown in FIGS. 4 and 8, no description will be given of the other combinations.

According to the present invention, the data terminal which is connected to a communication line via a modem interface such as RS-232C can automatically be actuated only for a period of time necessary for a communication operation. Hence the present invention ensures automatic reception and improves the safety against accidents.

What we claim is:

1. A power source control system comprising a power source control unit provided between a data terminal and a modem connected to a communication line, said power source control unit comprising:
a protocol control circuit for immediately performing through the modem a line establishing procedure between the power control unit and a calling party connected to the communication line including the sending out of a carrier without signaling to the data terminal in response to an incoming call from the modem, and for receiving a carrier from the calling party through the modem and a power source control circuit for turning ON of power application to the data terminal up to the end of the incoming call in response to receiving any predetermined signal of said line establishing procedure or receiving the carrier from the calling party, and a data terminal status detector for controlling the modem to disconnect the communication line in a case where although the power to the data terminal is turned ON, a signal of data terminal readiness is not transmitted from the data terminal within a predetermined time.

2. A power source control system comprising a power source control unit provided between a data terminal and a modem connected to a communication line, said power source control unit comprising:
a protocol control circuit for immediately performing through the modem a line establishing procedure between the power control unit and a calling party connected to the communication line including the sending out of a carrier without signaling to the data terminal in response to an incoming call from the modem, and for receiving a carrier from the calling party through the modem and a power source control circuit for turning ON of power application to the data terminal up to the end of the incoming call in response to receiving any predetermined signal of said line establishing procedure or receiving the carrier from the calling party, a wrong call detector for controlling the modem to disconnect the communication line in a case of a determination the incoming call is a wrong call when a measured time from the detection of the incoming call to the detection of the carrier from the calling party is longer than a predetermined time, and a data terminal status detector for controlling the modem to disconnect the communication line in a case where although the power to the data terminal is turned ON, a signal of data terminal readiness is not transmitted from the data terminal within a predetermined time.

3. A power source control system comprising a power source control unit provided between a data terminal and a modem connected to a communication line, said power source control unit comprising:

a protocol control circuit for immediately performing through the modem a line establishing procedure between the power control unit and a calling party connected to the communication line including the sending out of a carrier without signaling to the data terminal in response to an incoming call from the modem, and for receiving a carrier from the calling party through the modem and a power source control circuit for turning ON of power application to the data terminal up to the end of the incoming call in response to receiving any predetermined signal of said line establishing procedure or receiving the carrier from the calling party, said power source control unit comprising a data terminal status detector for controlling the modem to disconnect the communication line in a case where although the power to the data terminal is turned ON, a signal of data terminal readiness is not transmitted from the data terminal within a predetermined time, and said power source control unit further comprising means for turning OFF power application to the data terminal in response to an output of the data terminal status detector.

4. A power source control system comprising a power source control unit provided between a data terminal and a modem connected to a communication line, said power source control unit comprising:

a protocol control circuit for immediately performing through the modem a line establishing procedure between the power control unit and a calling party connected to the communication line including the sending out of a carrier without signaling to the data terminal in response to an incoming call from the modem, and for receiving a carrier from the calling party through the modem, and a power source control circuit for turning ON of power application to the data terminal up to the end of the incoming call in response to receiving any predetermined signal of said line establishing procedure or receiving the carrier from the calling party, a wrong call detector for controlling the modem to disconnect the communication line in a case of a determination the incoming call is a wrong call when a measured time from the detection of the incoming call to the detection of the carrier from the calling party is longer than a predetermined time, a data terminal status detector for controlling the modem to disconnect the communication line in a case where although the power to the data terminal is turned ON, a signal of data terminal readiness is not transmitted from the data terminal within a predetermined time, and said power source control unit further comprising means for turning OFF power application to the data terminal in response to an output of the data terminal status detector.

5. A power source control system comprising a power source control unit provided between a date terminal and a modem connected to a communication line, said power source control unit comprising:

a protocol control circuit for immediately performing through the modem a line establishing procedure including the sending out of a carrier without signaling to the data terminal in response to an incoming call from the modem, and for receiving a carrier from a calling party through the modem and a power source control unit for turning ON of power application to the data terminal in response to ringing detection (CI) or a data set ready signal (DR) and said power source control unit further comprising a data terminal status detector for controlling the modem to disconnect the communication line in a case where although the power to the data terminal is turned ON, a signal of data terminal readiness is not transmitted from the data terminal within a predetermined time.

6. A power source control system according to claim 5, in which said power source control unit further comprises means for turning OFF power application to the data terminal in response to an output of the data terminal status detector.

7. A power source control system comprising a power source control unit provided between a data terminal and a modem connected to a communication line, said power source control unit comprising:

a protocol control circuit for immediately performing through the modem a line establishing procedure including the sending out of a carrier without signaling to the data terminal in response to an incoming call from the modem, and for receiving a carrier from a calling party through the modem and a power source control unit for turning ON of power application to the data terminal in response to ringing detection (CI) or a data set ready signal (DR) said power source control unit further comprising a wrong call detector for controlling the modem to disconnect the communication line in a case of a determination the incoming call is a wrong call when a measured time from the detection of the incoming call to the detection of the carrier from the calling party is longer than a predetermined time, and said power source control including a data terminal status detector for controlling the modem to disconnect the communication line in a case where although the power to the data terminal is turned ON, a signal of data terminal readiness is not transmitted from the data terminal within a predetermined time.

8. A power source control system according to claim 7, in which said power source control unit further comprises means for turning OFF power application to the data terminal in response to an output of the data terminal status detector.

* * * * *